(12) United States Patent
Zhang et al.

(10) Patent No.: US 12,361,204 B1
(45) Date of Patent: Jul. 15, 2025

(54) EXTRACTING RELEVANT INFORMATION FROM A DOCUMENT

(71) Applicant: Tiny Fish Inc., Cupertino, CA (US)

(72) Inventors: Shuhao Zhang, Cupertino, CA (US);
Wenjie Hu, Palo Alto, CA (US);
Mingyang Li, Bellevue, WA (US)

(73) Assignee: Tiny Fish Inc., Cupertino, CA (US)

( * ) Notice: Subject to any disclaimer, the term of this patent is extended or adjusted under 35 U.S.C. 154(b) by 0 days.

(21) Appl. No.: 18/939,331

(22) Filed: Nov. 6, 2024

(51) Int. Cl.
| | |
|---|---|
| *G06F 17/00* | (2019.01) |
| *G06F 16/903* | (2019.01) |
| *G06F 40/169* | (2020.01) |
| *G06F 40/30* | (2020.01) |

(52) U.S. Cl.
CPC ...... *G06F 40/169* (2020.01); *G06F 16/90335* (2019.01); *G06F 40/30* (2020.01)

(58) Field of Classification Search
CPC ... G06F 40/169; G06F 40/30; G06F 16/90335
See application file for complete search history.

(56) References Cited

U.S. PATENT DOCUMENTS

| | | | | |
|---|---|---|---|---|
| 7,730,087 B2 * | 6/2010 | Dexter | ................ | G06F 16/8373 707/778 |
| 8,005,850 B2 * | 8/2011 | Walther | .............. | G06F 16/9558 707/758 |
| 8,706,491 B2 * | 4/2014 | Chelba | .................. | G06F 40/205 704/231 |
| 11,837,004 B1 * | 12/2023 | Agrahari | .......... | G06V 30/19147 |
| 11,947,915 B1 * | 4/2024 | Shen | ...................... | G06F 40/247 |
| 12,019,663 B1 * | 6/2024 | Zhang | .................... | G06F 40/30 |
| 2008/0104048 A1 * | 5/2008 | Surendran | ........... | G06F 16/9535 707/999.005 |
| 2015/0310016 A1 * | 10/2015 | Lamkhede | ............ | G06F 16/374 707/706 |
| 2018/0101527 A1 * | 4/2018 | Govindarajan | ......... | G06F 16/93 |
| 2020/0073882 A1 * | 3/2020 | Guggilla | .................. | G06N 5/02 |
| 2020/0133967 A1 * | 4/2020 | Shukla | ................ | G06F 16/3334 |
| 2021/0200813 A1 * | 7/2021 | Xu | ....................... | G06F 16/3347 |
| 2021/0232613 A1 * | 7/2021 | Raval Contractor | .... | G06N 5/02 |
| 2023/0153531 A1 * | 5/2023 | Geng | ..................... | G06N 3/084 704/9 |
| 2023/0386663 A1 * | 11/2023 | Foody | ..................... | G16H 10/60 |
| 2024/0273793 A1 * | 8/2024 | DeCharms | ............... | G09B 5/06 |
| 2024/0370789 A1 * | 11/2024 | Singh | ................. | G06Q 10/0631 |
| 2025/0021739 A1 * | 1/2025 | Shin | ....................... | G06F 40/103 |
| 2025/0077558 A1 * | 3/2025 | Zhang | .................... | G06F 40/205 |

FOREIGN PATENT DOCUMENTS

| | | | | |
|---|---|---|---|---|
| CN | 118643144 A | * | 9/2024 | |
| WO | WO-2011097057 A2 | * | 8/2011 | ......... G06F 16/3329 |
| WO | WO-2023242540 A1 | * | 12/2023 | |
| WO | WO-2024005413 A1 | * | 1/2024 | |

OTHER PUBLICATIONS

CN118643144A, English translation, published Sep. 13, 2024, filed Aug. 19, 2024, pp. 1-11. (Year: 2024).*
WO2024/005413 A1, English translation, published Jan. 4, 2024, filed Jun. 16, 2023, pp. 1-16 (Year: 2023).*

* cited by examiner

*Primary Examiner* — Laurie A Ries
(74) *Attorney, Agent, or Firm* — Van Pelt, Yi & James LLP (57) ABSTRACT

A document associated with a query is preprocessed including by deconstructing the query into individual components and understanding a relationship between the individual components. A query response is received. An annotated version of the document is outputted.

28 Claims, 5 Drawing Sheets

```
{
    project {
        project_number
        lowest_bidder
        lowest_bid
    }
}
```
} 302

FIG. 3

```
"project": [
    {
        "project_number": "230596",
        "lowest_bidder": "SHELLY & SANDS INC",
        "lowest_bid": "$2,926,962.84"
    },
    {
        "project_number": "240002",
        "lowest_bidder": "SHELLY COMPANY",
        "lowest_bid": "$2,439,243.10"
    },
    {
        "project_number": "240003",
        "lowest_bidder": "ALAN STONE CO INC",
        "lowest_bid": "$2,094,251.80"
    },
    {
        "project_number": "240004",
        "lowest_bidder": "ALLARD EXCAVATION LLC",
        "lowest_bid": "$1,170,853.77"
    },
    {
        "project_number": "240005",
        "lowest_bidder": "BCC OHIO INC",
        "lowest_bid": "$305,675.24"
    },
```

State of Ohio - Department of Transportation
Bid Results

Page: 1
Date: 02/02/24
Time: 7:02 AM

500 ⟶

| Project | | | | | |
|---|---|---|---|---|---|
| *Project Number* | | *Project number* | *Number* | *Letting Date* | *Completion Date* *Federal State* |
| 230596 | AWARDED | Franklin SR 3-19.92 | 106260 | 1/11/2024 | 10/15/2024 E191(799) |
| | | *State Estimate* $2,757,000.00 | FOUR LANE RESURFACING DBE Goal | | |
| *Contractor* | Lowest Bidder | *Address* | | | *Bid Amount* % |
| SHELLY & SANDS INC | | 1515 HARMON AVE, COLUMBUS, OH 43223 | | | Lowest Bid $2,926,962.84 +6.16 |
| | AWARDED | | | | |
| KOKOSING CONSTRUCTION COMPANY INC | | 6235 WESTERVILLE RD, WESTERVILLE, OH 43081 | | | $3,346,897.70 +21.40 |

502

| *Project Number* | | | *Number* | *Letting Date* | *Completion Date* *Federal State* |
|---|---|---|---|---|---|
| 240002 | AWARDED | | 105337 | 1/11/2024 | 7/31/2024 E191(794) |
| Auglaize SR 196/SR 197/SR 196-VAR | | *State Estimate* $2,223,000.00 | TWO LANE RESURFACING DBE Goal | | |
| *Contractor* | | *Address* | | | *Bid Amount* % |
| SHELLY COMPANY | | 80 PARK DR BOX 266, THORNVILLE, OH 43076 | | | $2,439,243.10 +9.73 |
| | AWARDED | | | | |

| *Project Number* | | | *Number* | *Letting Date* | *Completion Date* *Federal State* |
|---|---|---|---|---|---|
| 240003 | AWARDED | | 114188 | 1/11/2024 | 10/31/2024 E210(163) |
| Belmont SR 147-02.84 | | *State Estimate* $2,558,000.00 | SLIDE REPAIR DBE Goal | | |
| *Contractor* | | *Address* | | | *Bid Amount* % |
| ALAN STONE CO INC | | 5519 St. Rt. 339, Suite A, Vincent, OH 45784 | | | $2,094,251.80 -18.13 |
| | AWARDED | | | | |
| OHIO-WEST VIRGINIA EXCAVATING CO | | 56461 FERRY LANDING ROAD, SHADYSIDE, OH 43947 | | | $2,122,115.20 -17.04 |
| LITMAN EXCAVATING INC | | 836 1ST STREET, NEW MARTINSVILLE, WV 26155 | | | $2,194,800.47 -14.20 |
| DENNISON BRIDGE INC | | 500 STILLWATER AVE, DENNISON, OH 44621 | | | $2,344,424.50 -8.35 |
| SHELLY & SANDS INC | | 1515 HARMON AVE, COLUMBUS, OH 43223 | | | $2,369,930.00 -7.35 |

FIG. 5

EXTRACTING RELEVANT INFORMATION FROM A DOCUMENT

BACKGROUND OF THE INVENTION

Optical Character Recognition (OCR) is a technology that transforms various types of documents—such as PDFs, images, and word processing files—into editable and searchable digital text. OCR software identifies the shapes of letters and words in these images, converting them into digital characters. However, current software solutions lack the ability to interpret OCR processed documents with the contextual depth and nuance of a human reader. When humans extract data from a document, they don't review the entire document in detail to absorb all its textual and visual content. Instead, they quickly scan the document, focusing on specific information they need, using semantic and visual cues within the content to locate the relevant data efficiently.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods to extract relevant information from a document are disclosed herein. A document, such as a PDF, text document, image, slide deck, spreadsheet, flowchart document, etc., may undergo OCR to generate an OCR processed document that includes editable and searchable digital text. A user may provide a query specifying the relevant information they want to extract from the OCR processed document. However, unlike HTML pages, OCR processed documents lack the structure to find the relevant information associated with a query. Utilizing the systems and methods disclosed herein, relevant information associated with a document will be extracted and provided in response to a query. The systems and methods disclosed herein enable relevant information to be extracted from any document, that is, any type of query for any type of document may be determined. That is, a structured query may be performed on any unstructured document.

Figure 1A:
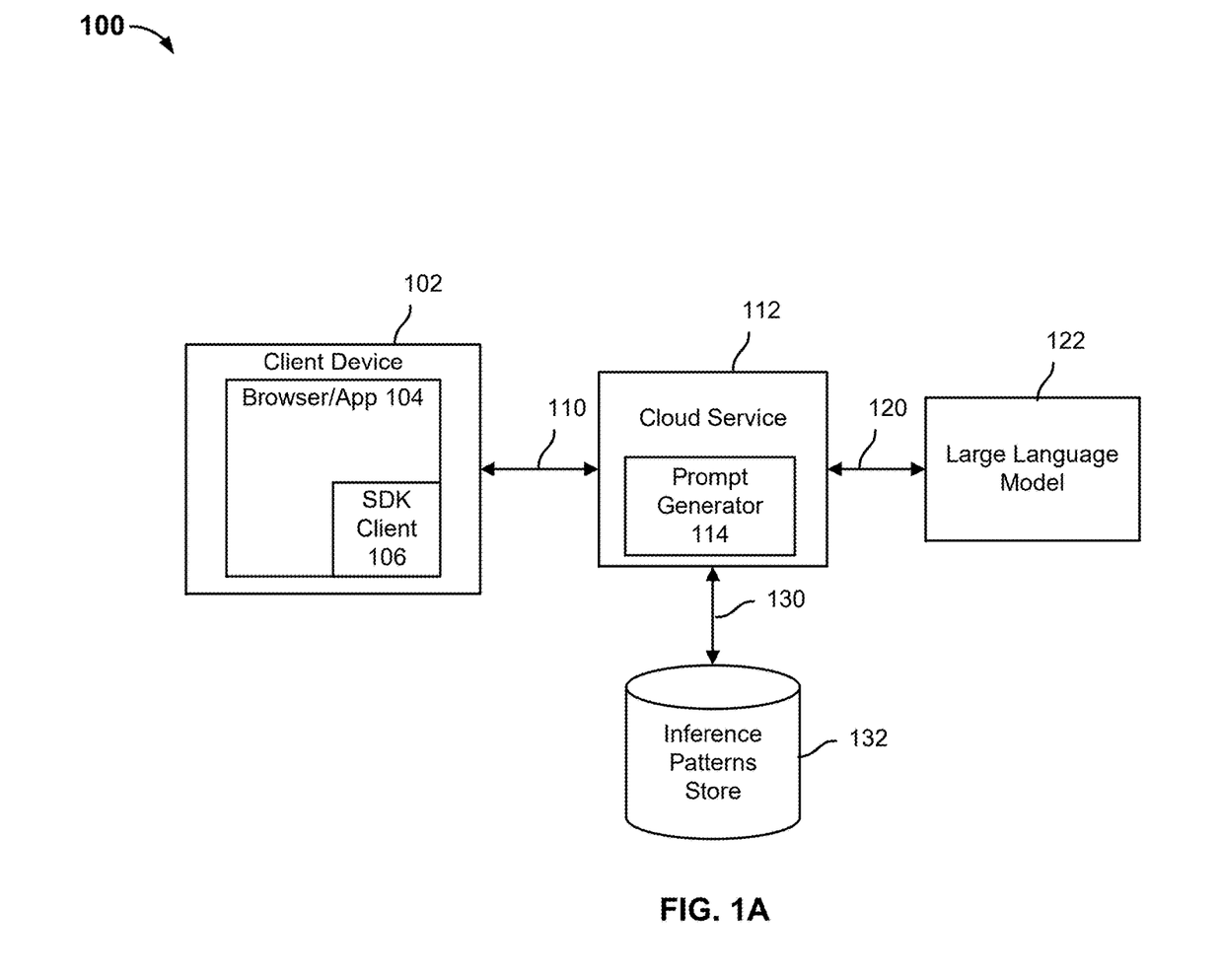
FIG. 1A illustrates a system to extract relevant information from a document in accordance with some embodiments.

FIG. 1A is a block diagram illustrating an embodiment of a system to extract relevant information from a document in accordance with some embodiments. In the example shown, system 100 includes client device 102, runtime agent 112, cloud service 122, large language model 132, and inference patterns store 142.

Client device 102 is configured to obtain an electronic version of a document. Client device 102 may be a computer, a server, a desktop, a laptop, a smart phone, a tablet, a virtual reality device, a smart device (e.g., smart glasses, smart watch, etc.), an artificial intelligence device, or any other computing device. In some embodiments, the document is generated by client device 102. For example, client device 102 may have one or more installed applications that generate documents (e.g., text document, slide deck, spreadsheet, flowchart document). In some embodiments, the document is downloaded by client device 102. For example, the document may be an attachment included in an email received by client device 102. In some embodiments, the document is scanned by client device 102. For example, client device 102 may include an image sensor and an application to convert a captured image into an electronic document. In some embodiments, an audio file or video file is transcribed into an electronic document.

Browser/app 104 is configured to receive a query associated with a document. Code associated with SDK client 106 is included in browser/app 104.

SDK client 104 is configured preprocess the document to enable large language model 122 to generate a query response. In some embodiments, SDK client 104 is configured to perform OCR on the document. In some embodiments, the document is already an OCR processed document. In some embodiments, a document includes a table that is misaligned. SDK client 104 is configured to realign the table. In some embodiments, the table is missing one or more lines. SDK client 104 is configured to modify the table to include the one or more missing lines. In some embodiments, a document includes one or more words have a small font (e.g., 6 pt. font). SDK client 104 is configured to adjust the size of the one or more words having the small font to a more readable font size (e.g., 12 pt font). In some embodiments, a document includes difficult to understand because of poor resolution. SDK client 104 is configured to improve a resolution associated with a document. In some embodiments, a document includes handwritten characters. SDK client 104 is configured to convert the handwritten characters into text characters (ascii). In some embodiments, a document includes poorly structured content (e.g., floating words). SDK client 104 is configured to provide structure to the poorly structured content.

Figure 3:
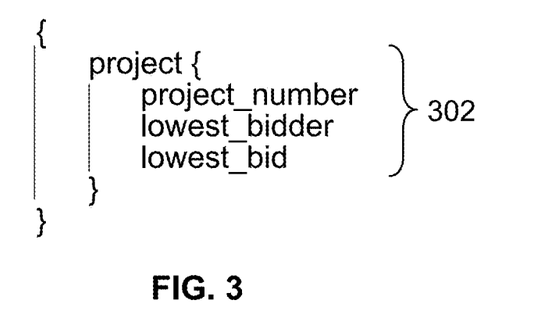
FIG. 3 illustrates an example of a query in accordance with some embodiments.

SDK client 104 is configured to deconstruct the query into its individual components and understand the relationship between them. FIG. 4 illustrates an example of a query in accordance with some embodiments. In the example shown, SDK client 104 understands the query 302 as "a project is a section that contains a project number, lowest bidder as well as a lowest bid."

In response to understanding the relationship between the queried elements, SDK client 104 is configured to scan the document to locate sections that contain the queried elements by utilizing semantic understanding and visual cues. Semantic understanding is the ability to interpret and comprehend the meaning behind words, phrases, or sentences in context. SDK client 104 utilizes natural language processing to understand nuances like tone, intent, and the relationship between concepts included in the document text. For example, the query term "lowest bid" is understood to be a numerical value that is the lowest value in relation to other numerical values associated with other bidding numbers.

The query may include visual cues to help SDK client 104 identify the relevant information. For example, the query may indicate that a project number is a six-digit number sequence. When preprocessing the document, SDK client 104 is configured to ignore portions of the document that do not include a six-digit number sequence. A numerical value may be located after a "$". This indicates that the numerical value proceeding the "$" is a monetary amount.

Client device 102 is configured to request cloud service 112 to generate a query response by providing to cloud service 112 via connection 110, the query, some or all of the document, and the preprocessed information associated with the document. Connection 110 may be a wired or a wireless connection. Connection 110 may be the Internet, an intranet, a wireless area network, a personal area network, a wireless local area network, a virtual private network, etc. In response, prompt generator 114 utilizes the query, some or all of the document, and the preprocessed information associated with the document, to generate a prompt for LLM 122. Cloud service 112 provides the prompt to LLM 122 via connection 120. Connection 120 may be a wired or a wireless connection. Connection 120 may be the Internet, an intranet, a wireless area network, a personal area network, a wireless local area network, a virtual private network, etc.

In some embodiments, LLM 122 is part of cloud service 112. In some embodiments, LLM 122 is a separate entity from cloud service 112. LLM 122 may be a public LLM, a private LLM, or a hybrid LLM.

In response, LLM 122 is configured to generate a query response and provide the query response to cloud service 112. The query response maps one or more variables included in the query to one or more values included in the document. This response is designed to be user-friendly and easy to understand. It enhances the accessibility of documents, allowing users to quickly identify information without having to read the entire document.

In some embodiments, the document is a large document (e.g., includes more than a threshold number of pages). Providing the preprocessed information associated with the document along with the document enables LLM 122 to generate a more accurate query response because it focuses LLM 122's attention to particular portions of the document from which it should generate its response. In some embodiments, the preprocessed information associated with the document only includes the pages that SDK client 104 determined to include the relevant information associated with document. For example, for a 200 page document, SDK client 104 may have determined that pages 55-58 include information relevant to query 302. Instead of providing all 200 pages to LLM 122, a portion of the document (e.g., pages 55-58) is provided to the document along with the query and the preprocessed information associated with the document.

Figure 4:
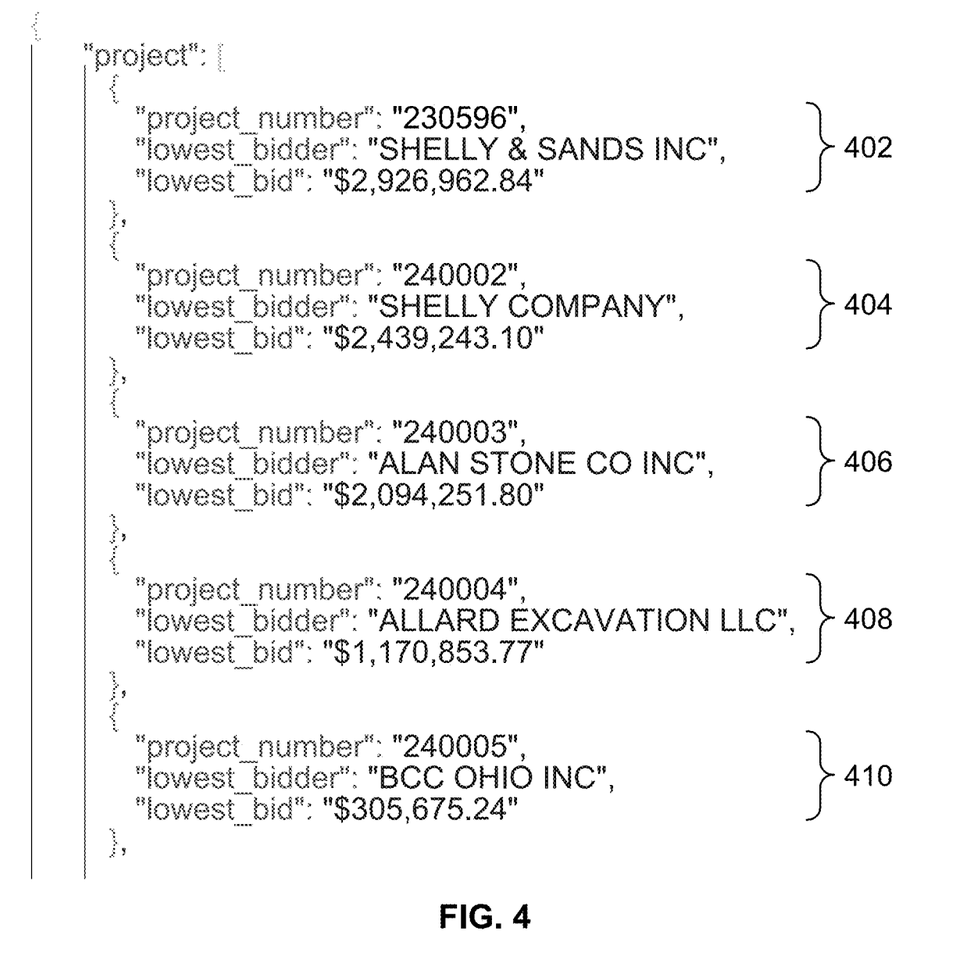
FIG. 4 is an example of a query response in accordance with some embodiments.

FIG. 4 is an example of a query response in accordance with some embodiments. Utilizing query 302 and the preprocessed information associated with a document, LLM 122 generated a query response that includes a first mapping 402, a second mapping 404, a third mapping 406, a fourth mapping 408, and a fifth mapping 410. The first mapping 402 indicates that the document includes a project having a project number of "230596" where the lowest bidder is "SHELLY & SANDS INC" with a bid of "$2,926,962.84". The second mapping 404 indicates that the document includes a project having a project number of "240002" where the lowest bidder is "SHELLY COMPANY" with a bid of "$2,439,243.10". The third mapping 406 indicates that the document includes a project having a project number of "240003" where the lowest bidder is "ALAN STONE CO INC" with a bid of "$1,170,853,77". The fourth mapping 408 indicates that the document includes a project having a project number of "240004" where the lowest bidder is "ALLARD EXCAVATION LLC" with a bid of "$1,170,853.77". The fifth mapping 410 indicates that the document includes a project having a project number of "240005" where the lowest bidder is "BBC OHIO INC" with a bid of "$305,675.24".

Cloud service 112 is configured to receive the query response from LLM 122. Cloud service 112 is configured to store the query response in inference patterns store 132 via connection 130 for one or more subsequent queries associated with the document. The query response is stored along with the query. Connection 130 may be the Internet, an intranet, a wireless area network, a personal area network, a wireless local area network, a virtual private network, etc. In some embodiments, it is determined whether the query and document match a previously received document and query. In response to a determination that the query and document match a previously received document and query, the query response is provided to the client device 102 instead of utilizing LLM 122 to generate the query response. In response to a determination that the query and document do not match a previously received document and query, a prompt is generated and the prompt is provided to LLM 122.

Cloud service 112 is configured to provide the query response to client device 102. In response to receiving the query response, SDK 104 is configured to post-process the document. In some embodiments, post-processing the document includes annotating the document in a manner that is understandable to the user.

Figure 5:
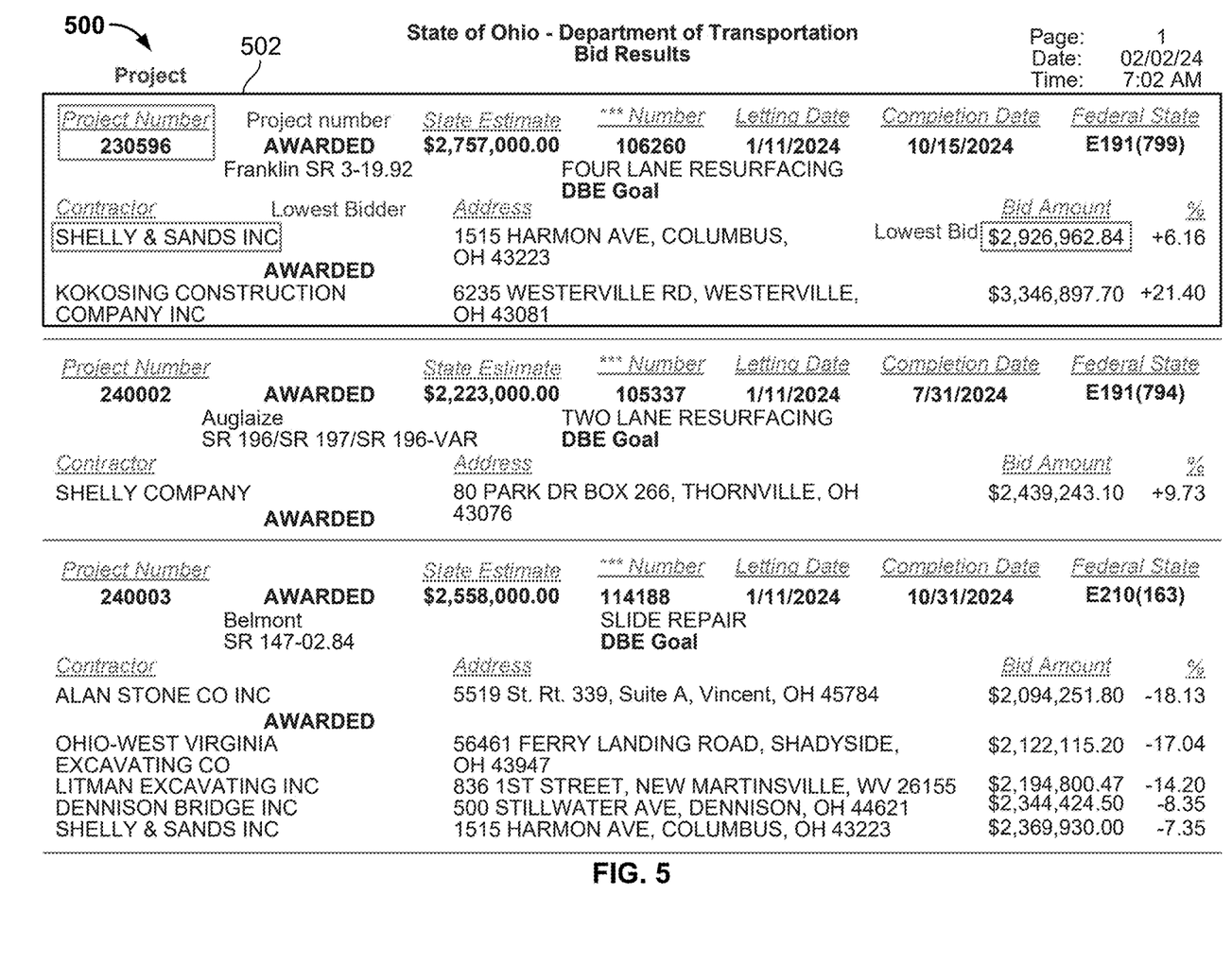
FIG. 5 is an annotated version of a document in accordance with some embodiments.

FIG. 5 is an annotated version of a document in accordance with some embodiments. In the example shown, annotated document 500 is a document listing a plurality of different projects, the contractor with the winning bid, and their corresponding bid. Annotated document 502 indicates that for a first project 502, the project number is "230596," the lowest bidder is "SHELLY & SANDS INC," and their bid was "$2,926,962.84."

Figure 1B:
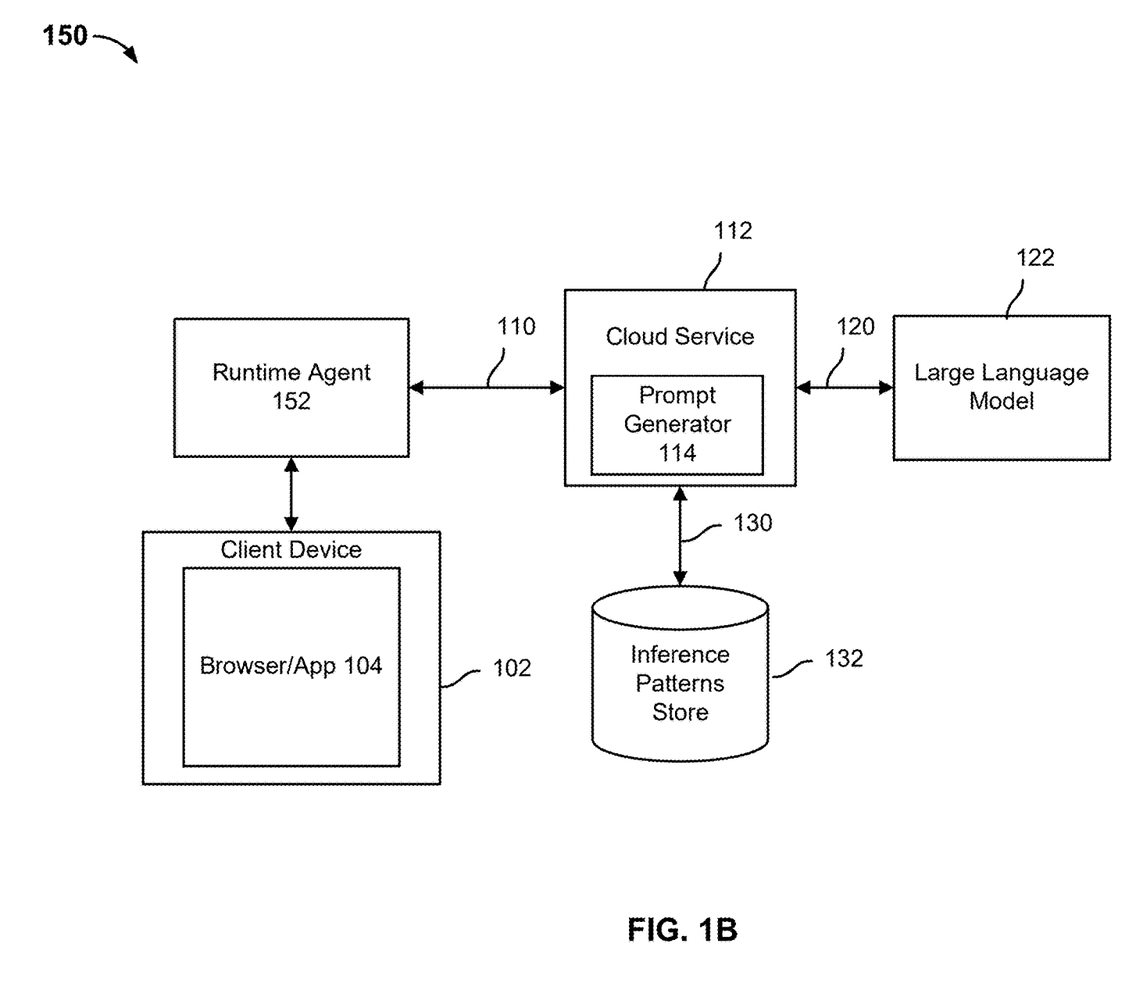
FIG. 1B illustrates a system to extract relevant information from a document in accordance with some embodiments.

FIG. 1B is a block diagram illustrating a system to extract relevant information from a document in accordance with some embodiments. System 150 is similar to system 100 except that browser/app 104 does not include SDK client 104. Instead, system 150 includes runtime agent 152. Runtime agent 152 is configured to receive the document from client device 102. Runtime agent 152 is configured to preprocess the received document in manner similar to SKD client 104. In some embodiments, runtime agent 152 is executed on a device separate from client device 102 (e.g., server). In some embodiments, runtime agent 152 is part of cloud service 112 and running on a server in a cloud environment.

Figure 2:
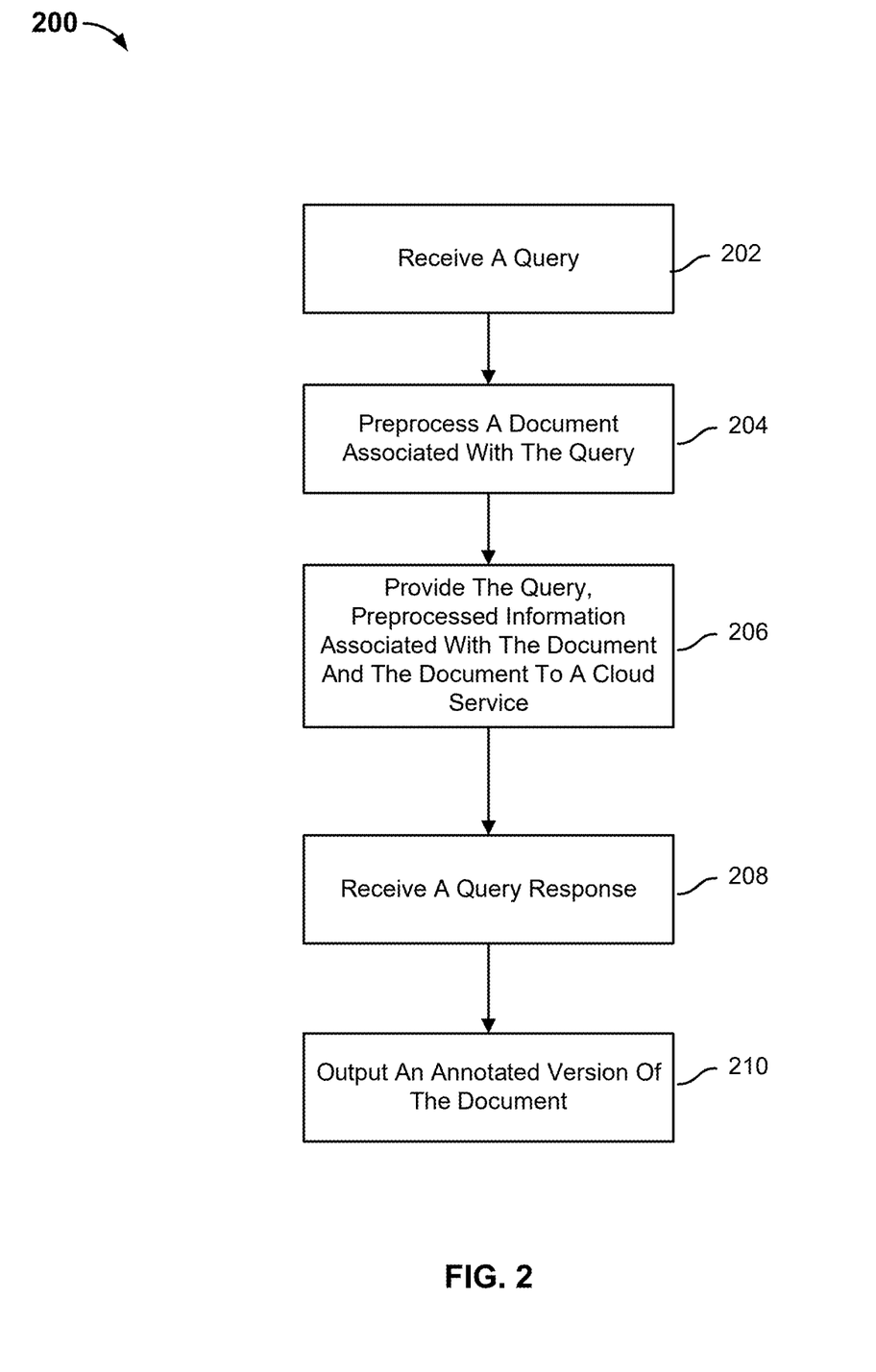
FIG. 2 illustrates a process to extract relevant information from a document in accordance with some embodiments.

FIG. 2 is a flow diagram illustrating a process to extract relevant information from a document in accordance with some embodiments. In some embodiments, process 200 is implemented by an SDK client, such as SDK client 106. In some embodiments, process 200 is implemented by a runtime agent, such as runtime agent 152.

At 202, a query is received. The query indicates one or variables associated with a document from which corresponding values should be determined. For example, the variables for query 302 include "project_number," "lowest_bidder," and "lowest_bid."

At 204, a document associated with the query is preprocessed. In some embodiments, OCR is performed on the document. In some embodiments, a table included in the document is misaligned and the table is realigned. In some embodiments, a table included in the document is missing one or more lines and the table is modified to include the one or more missing lines. In some embodiments, a document includes one or more words have a small font (e.g., 6 pt. font) and the size of the one or more words having the small font is adjusted to a more readable font size (e.g., 12 pt font). In some embodiments, a document includes difficult to understand because of poor resolution and a resolution associated with a document is adjusted. In some embodiments, a document includes handwritten characters. In some embodiments, a document includes handwritten characters and the handwritten characters are converted into text characters (ascii). In some embodiments, a document includes poorly structured content (e.g., floating words) and the poorly structured content is converted into structured content.

Preprocessing includes breaking down the query into its individual components and understand the relationship between them. In response to understanding the relationship between the queried elements, preprocessing the document includes scanning the document to locate sections that contain the queried elements by utilizing semantic understanding and visual cues. Natural language processing may be utilized to understand nuances like tone, intent, and the relationship between concepts included in the document text. For example, the query term "lowest bid" is understood to be a numerical value that is the lowest value in relation to other numerical values associated with other bidding numbers.

The query may include visual cues to help identify the relevant information in a document. For example, the query may indicate that a project number is a six-digit number sequence. When preprocessing the document, preprocessing the document may include ignoring portions of the document that do not include a six-digit number sequence. A numerical value may be located after a "$". This indicates that the numerical value proceeding the "$" is a monetary amount.

The location(s) of the document that include the identified relevant information are determined and target information is extracted from the located locations.

At 206, the query, some or all of a document, and the preprocessed information associated with the document is provided to a cloud service. In response, the cloud service generates a prompt for a large language model based on the received the query, some or all of the document, and the preprocessed information associated with the document.

At 208, a query response is received. The query response maps one or more variables included in the query to one or more corresponding values in the document.

At 210, an annotated version of the document is outputted. The document is post-processed based on the query response. For example, portions of the document that correspond to the one or more variables included in the query may be highlighted, bolded, italicized, boxed, or any other visual indication to direct a user's attention to a particular portion of the document. Post-processing the document includes finding the portion(s) of the document that correspond to the mapping included in the query response and annotating that portion(s) of the document.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   preprocessing a document associated with a query including by deconstructing the query into individual components and understanding a relationship between the individual components, wherein preprocessing the document associated with the query includes scanning the document to locate sections of the document that include elements associated with the query;
   providing the located sections of the document that include the elements associated with the query and the query to a cloud service;
   receiving a query response; and
   outputting an annotated version of the document.

2. The method of claim 1, further comprising receiving the document associated with the query.

3. The method of claim 1, wherein the document associated with the query is a document in a portable document format, a text document, a slide deck, a spreadsheet, or a flowchart document.

4. The method of claim 1, wherein the query includes one or more variables.

5. The method of claim 4, wherein the query response maps information included in the document to the one or more variables.

6. The method of claim 1, wherein preprocessing the document associated with the query includes performing optical character recognition on the document.

7. The method of claim 1, wherein preprocessing the document associated with the query includes modifying a table to include one or more missing lines.

8. The method of claim 1, wherein preprocessing the document associated with the query includes modifying a size of a font associated with one or more words included in the document.

9. The method of claim 1, wherein the cloud service generates a prompt based at least in part on the provided sections of the document that include the elements associated with the query and the query.

10. The method of claim 1, wherein the cloud service provides the prompt to a large language model, wherein the large language model generates the query response based on the provided prompt.

11. A method, comprising:
- preprocessing a document associated with a query including by deconstructing the query into individual components and understanding a relationship between the individual components, wherein preprocessing the document associated with the query includes realigning a table included in the document;
- receiving a query response; and
- outputting an annotated version of the document.

12. A method, comprising:
- preprocessing a document associated with a query including by deconstructing the query into individual components and understanding a relationship between the individual components, wherein preprocessing the document associated with the query includes adjusting a resolution associated with the document;
- receiving a query response; and
- outputting an annotated version of the document.

13. A method, comprising:
- preprocessing a document associated with a query including by deconstructing the query into individual components and understanding a relationship between the individual components, wherein preprocessing the document associated with the query includes converting handwritten characters into text characters;
- receiving a query response; and
- outputting an annotated version of the document.

14. A method, comprising:
- preprocessing a document associated with a query including by deconstructing the query into individual components and understanding a relationship between the individual components, wherein preprocessing the document associated with the query includes providing structure to floating words;
- receiving a query response; and
- outputting an annotated version of the document.

15. A method, comprising:
- preprocessing a document associated with a query including by deconstructing the query into individual components and understanding a relationship between the individual components, wherein preprocessing the document associated with the query includes scanning the document to locate sections of the document that include elements associated with the query, wherein scanning the document to locate sections of the document that include elements associated with the query includes utilizing semantic understanding and visual cues;
- receiving a query response; and
- outputting an annotated version of the document.

16. A system, comprising:
- a processor configured to:
  - preprocess a document associated with a query including by deconstructing the query into individual components and understanding a relationship between the individual components, wherein preprocessing the document associated with the query includes scanning the document to locate sections of the document that include elements associated with the query;
  - provide the located sections of the document that include the elements associated with the query and the query to a cloud service;
  - receive a query response; and
  - output an annotated version of the document; and
- a memory coupled to the processor and configured to provide the processor with instructions.

17. The system of claim 16, wherein the document associated with the query is a document in a portable document format, a text document, a slide deck, a spreadsheet, or a flowchart document.

18. A computer program product embodied in a non-transitory computer readable medium and comprising computer instructions for:
- preprocessing a document associated with a query including by deconstructing the query into individual components and understanding a relationship between the individual components, wherein preprocessing the document associated with the query includes scanning the document to locate sections of the document that include elements associated with the query;
- providing the located sections of the document that include the elements associated with the query and the query to a cloud service;
- receiving a query response; and
- outputting an annotated version of the document.

19. A system, comprising:
- a processor configured to:
- preprocess a document associated with a query including by deconstructing the query into individual components and understanding a relationship between the individual components, wherein preprocessing the document associated with the query includes realigning a table included in the document;
- receive a query response; and
- output an annotated version of the document.

20. A computer program product embodied in a non-transitory computer readable medium and comprising computer instructions for:
- preprocessing a document associated with a query including by deconstructing the query into individual components and understanding a relationship between the individual components, wherein preprocessing the document associated with the query includes realigning a table included in the document;
- receiving a query response; and
- outputting an annotated version of the document.

21. A system, comprising:
- a processor configured to:
- preprocess a document associated with a query including by deconstructing the query into individual components and understanding a relationship between the individual components, wherein preprocessing the document associated with the query includes adjusting a resolution associated with the document;
- receive a query response; and
- output an annotated version of the document.

22. A computer program product embodied in a non-transitory computer readable medium and comprising computer instructions for:
- preprocessing a document associated with a query including by deconstructing the query into individual components and understanding a relationship between the individual components, wherein preprocessing the document associated with the query includes adjusting a resolution associated with the document;

receiving a query response; and outputting an annotated version of the document.

23. A system, comprising:

a processor configured to:

preprocess a document associated with a query including by deconstructing the query into individual components and understanding a relationship between the individual components, wherein preprocessing the document associated with the query includes converting handwritten characters into text characters;

receive a query response; and output an annotated version of the document.

24. A computer program product embodied in a non-transitory computer readable medium and comprising computer instructions for:

preprocessing a document associated with a query including by deconstructing the query into individual components and understanding a relationship between the individual components, wherein preprocessing the document associated with the query includes converting handwritten characters into text characters;

receiving a query response; and outputting an annotated version of the document.

25. A system, comprising:

a processor configured to:

preprocess a document associated with a query including by deconstructing the query into individual components and understanding a relationship between the individual components, wherein preprocessing the document associated with the query includes providing structure to floating words;

receive a query response; and output an annotated version of the document.

26. A computer program product embodied in a non-transitory computer readable medium and comprising computer instructions for:

preprocessing a document associated with a query including by deconstructing the query into individual components and understanding a relationship between the individual components, wherein preprocessing the document associated with the query includes providing structure to floating words;

receiving a query response; and outputting an annotated version of the document.

27. A system, comprising:

a processor configured to:

preprocess a document associated with a query including by deconstructing the query into individual components and understanding a relationship between the individual components, wherein preprocessing the document associated with the query includes scanning the document to locate sections of the document that include elements associated with the query, wherein scanning the document to locate sections of the document that include elements associated with the query includes utilizing semantic understanding and visual cues;

receive a query response; and output an annotated version of the document.

28. A computer program product embodied in a non-transitory computer readable medium and comprising computer instructions for:

preprocessing a document associated with a query including by deconstructing the query into individual components and understanding a relationship between the individual components, wherein preprocessing the document associated with the query includes scanning the document to locate sections of the document that include elements associated with the query, wherein scanning the document to locate sections of the document that include elements associated with the query includes utilizing semantic understanding and visual cues;

receiving a query response; and outputting an annotated version of the document.

\* \* \* \* \*